April 17, 1962
F. C. GABRIEL
3,030,584
ISOLATOR SYSTEM
Filed June 16, 1959
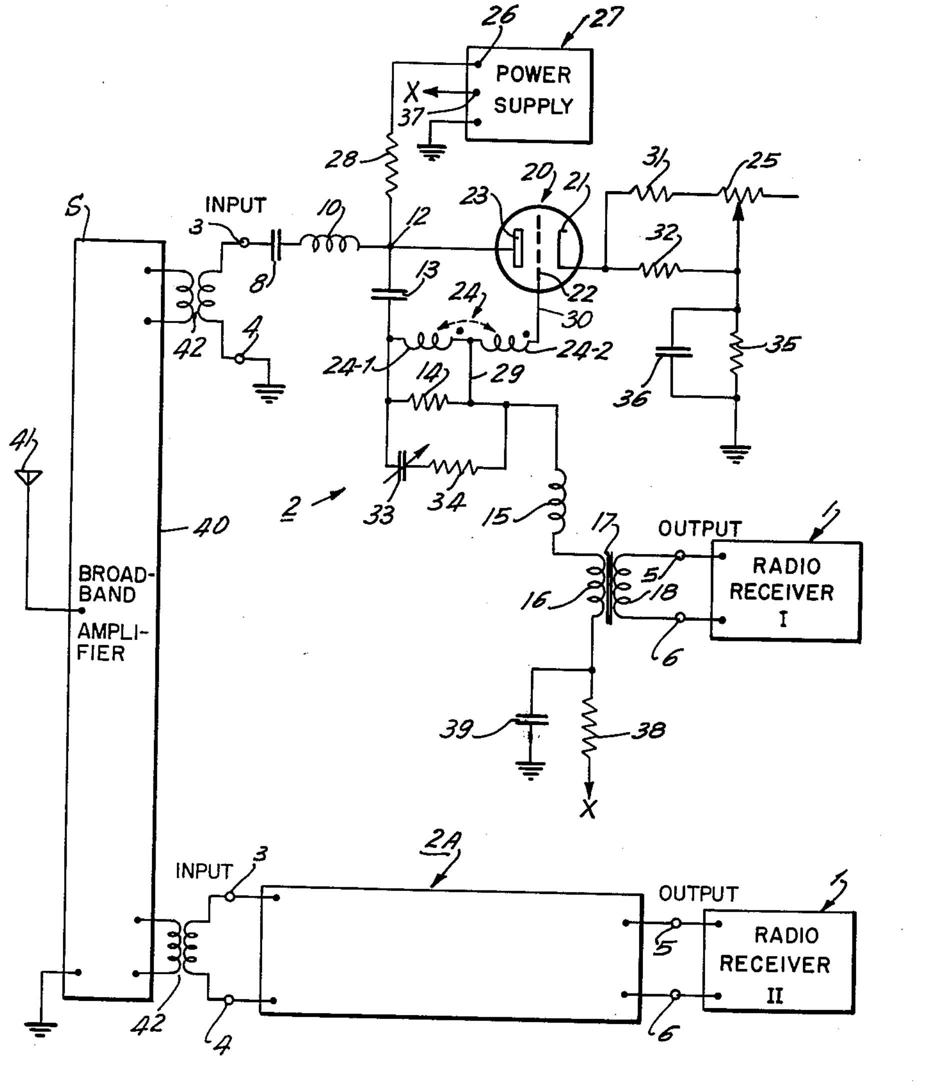
INVENTOR.
FRED GABRIEL
BY
Curtis, Morris & Safford
ATTORNEYS 3,030,584
Patented Apr. 17, 1962

3,030,584
ISOLATOR SYSTEM

Fred C. Gabriel, Stamford, Conn., assignor to C.G.S. Laboratories, Inc., Ridgefield, Conn.

Filed June 16, 1959, Ser. No. 820,804
7 Claims. (Cl. 328—209)

This invention relates to an improved isolator system providing low attenuation for signals which are sent through the system in the forward direction and providing extremely high attenuation for any signals attempting to pass through the system in the reverse direction. More particularly this invention relates to an electronic isolator system capable of operating over a wide range of frequencies and is in the nature of an improvement in the system shown in the copending application of Carl G. Sontheimer, Serial No. 794,640, filed February 20, 1959.

In communication installations there are applications which require that one source of signals operate a number of independent devices. To provide for proper operation of these independent devices it is important that each one of them be isolated from the common source of signals and from each other. For example, it may be desired to connect a number of individual radio receivers to a common antenna. Each one of the receivers is intended to perform its own job independently of and without interference from the other receivers.

Among the many advantages of the isolator system disclosed as illustrative of this invention are those resulting from the fact that the system provides extremely high attenuation for any signals flowing in the reverse direction, that is, for signals attempting to trace back through the system from the output to the input. As a result, the isolator system is quite effective in providing the desired isolation action and enables a large number of independent devices to be operated from a single source without any significant interference between them. Moreover, the wide range of frequencies which are accommodated by the isolation system make it well suited for use with radio receivers or other devices capable of operating over wide bands of frequencies.

The isolator system includes an electronic device producing a voltage which is equal in magnitude but opposite in phase to any signal flowing through the system in the reverse direction, thereby cancelling out these reverse signals. In operation the electronic device also tends to be actuated by the forward signals which are present in its control circuit. Thus, it would tend to draw current due to the presence of these forward signals, causing distortion of these forward signals. In order to remove these forward signals from the control electrode of the electronic device, a hybrid coil is connected to the control electrode. This hybrid coil acts as an auto-transformer to increase the voltage of the reverse signals applied to the control electrode, but cancels out the forward signals at the control electrode.

In addition to the advantage of preventing the forward signal from reaching the control electrode, the increased reverse voltage on the control electrode provided by the auto-transformer action also increases the bandwidth of the system over that which is obtained without the hybrid coil. The effective bandwidth is almost doubled by using the hybrid coil.

In this specification and in the accompanying drawing is described an isolator system which embodies the present invention, and it is to be understood that this is not intended to be exhaustive nor limiting of the invention, but rather is given for purposes of illustration in order that others skilled in the art may fully understand the invention and the manner of applying the isolation system in practical use so that they may modify and adapt it in various forms; each as may be best suited to the conditions of a particular use.

The various objects, aspects, and advantages of the present invention will be more fully understood from a consideration of the following specification in conjunction with the accompanying drawing. This drawing is a schematic circuit diagram of an isolator system for operating a number of independent devices 1, for example such as radio receivers as indicated in block form at I and II, from a common signal source S, shown by way of example as an antenna and broad-band amplifier. The isolator system includes a first isolator circuit, generally indicated at 2, and a second isolator circuit 2A which is identical with the circuit 2. This circuit 2A is shown in block form for convenience of illustration.

Signals from the source S are fed into the input of the isolator circuit 2 through a pair of input terminals 3 and 4. The independent device 1 which is being operated from the source S is connected to a pair of output terminals 5 and 6.

This isolator circuit 2 causes little attenuation of signals passing through it in the forward direction. The input signals are coupled through a capacitor 8 and a peaking coil 10 to a junction point 12. From the point 12 the signals continue in the forward direction through a capacitor 13, a resistor 14, a second peaking coil 15 to the primary 16 of an output transformer 17 having its secondary 18 connected to the output terminals 5 and 6.

In the reverse direction there is an extremely high attenuation because any signals tending to come from the secondary 18 and tending to pass through the resistor 14 in the reverse direction are cancelled out by the action of the electronic amplifier stage 20. In this example the electronic stage 20 is shown as a triode having a common electrode or cathode 21, a control electrode or grid 22 and a controlled electrode or anode 23. The action of the electronic stage 20 is to furnish to the junction point 12 a signal current which is 180° out of phase with any signals which may be introduced from the secondary 18 and pass through the resistor 14 in the reverse direction. These reverse signals cause a voltage to be applied through the connection 30 to the control electrode 22. The electronic device 20 produces a cancellation signal at the controlled electrole 23 which is equal in magnitude but opposite in phase to the reverse voltage reaching the junction point 12. Thus, the reverse signal is cancelled out and does not appear at the input terminals 3 and 4.

In order to minimize distortion of the forward signals caused by non-linearity in the electronic device 20, the distortion within the device 20 is held to a minimum by preventing the forward signals from reaching the control electrode 22. For this purpose, a hybrid coil 24 is provided having two mutually coupled halves 24–1 and 24–2 with a center connection 29 between them. The one half 24–1 of the hybrid coil 24 is connected across the resistor 14, and the other half 24–2 extends from the connection 29 to the control lead 30. As indicated by the positions of the dot symbols, the two halves of the hybrid coil are wound in the same sense. Thus, with respect to voltages appearing across the resistor 14 due to reverse signals, the two halves of the hybrid coil act as an auto-transformer. The voltage applied to the control lead is twice the voltage across the resistor 14.

However, with respect to voltages appearing across the resistor 14 due to forward signals, the induced voltage in the second half 24–2 of the coil acts in the opposite direction with respect to the voltage across the resistor 14. As a result, the voltage across the second half of the winding subtracts from the voltage across the first half, and the forward voltage is prevented from reaching the control lead 30. This reduces any slight distortion which would otherwise be caused by current drawn through the device 20 due to the presence of the forward signal on the control lead 30.

In operation, the gain of the electronic stage 20 is adjusted by means of the adjustable resistor 25 to provide the cancellation of the reverse signals at the junction point 12.

The auto-transformer action with respect to reverse signal voltages effectively doubles these voltages as they are applied to the control lead 30. This enables the use of a cathode resistor network 25, 31, 32 which has approximately twice as large a resistance value as could be used in a system without the hybrid coil. The result is an increase in negative current feedback which stabilizes the operation and broadens the range of operation of the system. This isolator circuit 2 is capable of operating over a wide frequency range, for example, from 2 to 32 megacycles because it is untuned. By adjusting the effective value of the control resistor 25, the amount of out-of-phase current is reduced until exact cancellation is provided. This signal cancellation is independent of the values of the output and input impedances.

For purposes of blocking the power supply voltage from the control electrode 22, the capacitor 13 is inserted between the junction point 12 and the resistor 14. The supply voltage is fed from a terminal 26 of a power supply 27 through a decoupling resistor 28 to the point 12 connected to the controlled electrode 23.

To improve the transmission at high frequencies, the peaking coil 15 is added in series with the output. Its purpose is to neutralize the effects of stray capacity between the control electrode connection 30 and the environment. The peaking coil 10 is similarly provided to neutralize effects of stray capacitance at the input to the circuit.

Because of the stray capacitance appearing across the resistor network 25, 31 and 32, the backward cancellation action of the stage 20 tends to shift in phase as the frequency increases. Thus, an adjustable trimming capacitor 33 is connected across the resistor 14 to maintain the desired cancellation balance at the input terminals for the higher frequencies within the range of operation. A further improvement in the balance can be made by adding a resistor 34 of small value in series with the trimming capacitor 33.

In order to stabilize the operating point of the stage 20, a stabilizing network 35, 36 is connected between the resistance network 25, 31, 32 and the common return circuit, as indicated by the "ground" symbol. This stabilizing network includes a resistor 35 shunted by a large capacitance 36. This resistor 35 and the large by-pass capacitor 36 act to set the operating current through the stage 20 at the desired value. By virtue of the fact that the resistor 35 is relatively large and is located in the circuit to the common electrode 21, the stage 20 is effectively supplied by a constant current source, thus stabilizing its operating point. As a result, the circuit 2 will remain in balance over a long period of time despite any changes in the parameters of the stage 20 due to aging or changes in the supply voltage.

Because of the presence of the large resistor 35 in the circuit connected to the common electrode 21, a suitable positive operating bias voltage must be applied to the control electrode 22. This positive bias voltage is fed from a supply terminal 37 of the source 27 through a resistor 38 and through the primary winding 16 and the peaking coil 15 to the control electrode. The connection from supply terminal 37 to the resistor 38 is indicated schematically at *x*—*x*, as will be understood. The shunt capacitor 39 bypasses radio-frequency signals to the common return "ground" circuit.

In order for the isolator circuit 2 to remain in balance over a full operating range, the resistance network 25, 31, and 32 should be of a high quality with a minimum of capacitance or inductance associated therewith. In practice the best way to build this resistance network 25, 31 and 32 is to use a high quality resistor 32 of somewhat higher value than the desired composite value and then to shunt this resistor 32 with a fixed resistor 31 and an adjustable resistor 25. Both the fixed resistor 31 and the adjustable resistor 25 should have a minimum amount of stray capacitance or inductance associated therewith.

In operation, the adjustable resistor 25 is adjusted to produce maximum attenuation in the reverse direction over the full operating range and this adjustment compensates for the tolerances of the other circuit components.

The broad-band amplifier 40 feeds the signals from the antenna 41 into the respective input terminals 3 and 4 through coupling transformers 42.

For optimum operation, the resistor 14 used in conjunction with the hybrid coil 24 should have a resistance value which is equal to the input resistance of the receiver 1 as reflected across the primary winding 16 of the transformer 17. Also, the effective resistance of the combined cathode resistor 25, 31, 32, should be about twice that which would be used if the hybrid coil were omitted and if the connection 29 were made directly to the lead 30.

Component values which work well in the isolator circuits 2 and 2A are as follows:

| Stage 20 | | Vacuum tube 417-A/5842 |
|---|---|---|
| C13 | microfarad | .01 |
| C36 | do | .01 |
| C39 | do | .01 |
| C33 | micromicrofarad | .5-1.5 |
| R14 | ohms | 510 |
| R25 | do | 2,000 |
| R31 | do | 4,800 |
| R32 | do | 1,120 |
| R35 | do | 360 |
| R34 | do | 300 |
| R38 | do | 4,700 |
| L10 | microhenries | 2.8 |
| L15 | do | 2.8 |

From the foregoing it will be understood that the isolator system of the present invention described above is well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. An electric isolator system having an input terminal and an output terminal and providing high attenuation for any signals trying to pass through the system in the reverse direction from output to input while providing little attenuation for signals passing through in the forward direction from input to output, said isolator system comprising an electronic device having a controlled electrode, a control electrode, and a common electrode, a source of unidirectional current, circuit means connecting said source in circuit between said common electrode and said controlled electrode for energizing said device, a control lead connected to said control electrode, an input circuit being connected from said input terminal to said controlled electrode, an output circuit connected to said output terminal, a hybrid coil having two series-connected halves with a center connection, one of said halves being connected to the input circuit with the center connection being connected to the output circuit, the other half being connected to said control lead, the two halves of said hybrid coil being wound in the same sense.

2. An electric isolator system having an input terminal and an output terminal and providing high attenuation for any signals trying to pass through the system in the reverse direction from output to input while passing signals through in the forward direction from input to output, said isolator system comprising an electronic device having a controlled electrode, a control electrode, and a common electrode, a source of undirectional current, circuit means connecting said source in circut between said common electrode and said controlled electrode for energizing said device, a control lead connected to said control electrode, an input circuit being connected from said input terminal to said controlled electrode, an output circuit connected to said output terminal, resistance means connected between said controlled electrode and said output circuit, a hybrid coil having two halves which are mutually coupled and connected in series with their direction of winding being in the same sense and with a center tap therebetween, one of said halves being connected across said resistance means with the center tap being connected to the output circuit, the other half being connected to said control lead.

3. An electrical isolator system having an input terminal and an output terminal and adapted to pass desired electrical signals therethrough in a forward direction from input to output and providing high attenuation for any undesired signals trying to go through the circut in the reverse direction from output to input, said isolator circuit comprising a vacuum tube having an anode, a control grid, and a cathode, a source of electrical power, circuit means connecting said source in circuit across said tube between said cathode and said anode for energizing the anode-cathode circuit of the tube, an input circuit connected from said input terminal to said anode and adapted to have the desired signals applied thereto, an output circuit connected to said output terminal from which the desired signals are adapted to be fed to a load circuit, and a coil having two identical halves which are in series and mutually coupled, a center-tap between the two halves of the coil, the end of one-half being connected to the input circuit with the center-tap being connected to the output circuit, the end of the other half being connected to the control grid.

4. An isolator system comprising an input circuit adapted to be connected to an antenna and an output circuit adapted to be connected to a radio receiver, a triode vacuum tube having its anode connected to the input circuit, a coil in circuit between the anode and grid of the triode, a center-tap on said coil, resistance means shunted across the half of said coil from the end toward the anode to the center-tap, said output circuit being connected to said center-tap.

5. An electric isolator system having an input terminal and an output terminal and providing high attenuation for any signals trying to pass through the system in the reverse direction from output to input while passing signals through in the forward direction from input to output, said isolator system comprising an electronic device having a controlled electrode, a control electrode, and a common electrode, an energizing circuit extending between said common electrode and said controlled electrode, an input circuit being connected from said input terminal to said controlled electrode, an output circuit connected to said output terminal, resistance means in circuit between said controlled electrode and said output circuit, a coil having two mutually coupled and series-connected halves with a center tap therebetween, the two-halves of said coil having the same winding direction one end of said coil being connected to the side of said resistance means nearer said controlled electrode, the center tap being connected to the side of said resistance means nearer said output circuit, the opposite end of said coil being connected to said control electrode, whereby forward signals are prevented from reaching said control electrode and said device cancels out reverse signals in the input circuit.

6. An electric isolator system having an input terminal and an output terminal and providing high attenuation for any reserve signals trying to pass through the system in the reverse direction from output to input while passing forward signals through in the forward direction from input to output, said isolator system comprising an electronic tube having an anode, a control grid, and a cathode, energizing means for the anode-cathode circuit of said tube, an input circuit being connected from said input terminal to said anode, an output circuit connected to said output terminal, resistance means in circuit between said anode and said output circuit, a coil having two series-connected, mutually coupled halves, each of which is wound in the same sense and with a center tap therebetween, one end of said coil being connected to the side of said resistance means nearer said anode, the center tap being connected to the side of said resistance means nearer said output circuit, the opposite end of said coil being connected to said control grid, whereby forward signals are prevented from reaching said control electrode and said device cancels out reverse signals in the input circuit.

7. An isolator system having an input circuit and an output circuit and wherein electrical signals are passed through the system in the forward direction from input to output but wherein reverse signals attempting to pass through the system in the reverse direction are cancelled out so as to isolate the input circuit from the output circuit, said system including an electronic control device having a controlled electrode, a control electrode, and a common electrode, energizing means for energizing the controlled-to-common electrode circuit of said device, a capacitor and coil in serial relationship between the controlled and control electrode, said coil having a center tap, a resistor connected from the center tap to the end of said coil which is effectively closer to said controlled electrode, said center tap being connected to the output circuit, and the other end of said coil being connected to the control electrode.

References Cited in the file of this patent

UNITED STATES PATENTS

| | | |
|---|---|---|
| 2,756,282 | Douma | July 24, 1956 |
| 2,849,610 | Umbach | Aug. 26, 1958 |